US012645797B2

(12) United States Patent
Moran et al.

(10) Patent No.: US 12,645,797 B2
(45) Date of Patent: Jun. 2, 2026

(54) MALWARE DETECTION FROM APPROXIMATE INDICATORS

(71) Applicant: Arm Limited, Cambridge (GB)

(72) Inventors: Brendan James Moran, Coton (GB); Michael Bartling, Austin, TX (US)

(73) Assignee: ARM LIMITED, Cambridge (GB)

( * ) Notice: Subject to any disclaimer, the term of this patent is extended or adjusted under 35 U.S.C. 154(b) by 367 days.

(21) Appl. No.: 18/303,144

(22) Filed: Apr. 19, 2023

(65) Prior Publication Data

US 2024/0354410 A1     Oct. 24, 2024

(51) Int. Cl.
*G06F 21/56*         (2013.01)
*H04L 9/40*          (2022.01)

(52) U.S. Cl.
CPC ........ *G06F 21/566* (2013.01); *H04L 63/1416* (2013.01)

(58) Field of Classification Search
None
See application file for complete search history.

(56) References Cited

U.S. PATENT DOCUMENTS

| | | | | |
|---|---|---|---|---|
| 9,419,996 | B2 * | 8/2016 | Porat | G06F 21/566 |
| 9,503,465 | B2 * | 11/2016 | Coskun | H04L 63/1425 |
| 10,104,100 | B1 * | 10/2018 | Bogorad | H04L 63/1425 |
| 10,360,089 | B2 | 7/2019 | Crosby et al. | |
| 11,055,405 | B1 * | 7/2021 | Jin | G06F 21/552 |
| 2015/0096025 | A1 * | 4/2015 | Ismael | G06F 21/566 |
| | | | | 726/23 |

| | | | | |
|---|---|---|---|---|
| 2015/0205961 | A1 * | 7/2015 | Franklin | H04L 63/0209 |
| | | | | 726/11 |
| 2015/0220735 | A1 | 8/2015 | Paithane et al. | |
| 2016/0285717 | A1 * | 9/2016 | Kim | H04L 41/0631 |
| 2017/0017793 | A1 * | 1/2017 | Davis | G06N 3/08 |
| 2018/0165142 | A1 * | 6/2018 | Harutyunyan | G06F 11/0751 |
| 2019/0114421 | A1 * | 4/2019 | Das | G06F 21/566 |
| 2019/0166144 | A1 * | 5/2019 | Mirsky | G06N 20/20 |
| 2019/0171622 | A1 * | 6/2019 | Zong | G06F 16/24542 |
| 2019/0238565 | A1 * | 8/2019 | Wang | G06F 21/566 |
| 2020/0210576 | A1 * | 7/2020 | Chistyakov | G06N 5/04 |

(Continued)

OTHER PUBLICATIONS

International Search Report and Written Opinion issued in International Application No. PCT/GB2024/050356, mailed Mar. 18, 2024, 15 pages.

*Primary Examiner* — Christopher C Harris
(74) *Attorney, Agent, or Firm* — Talem IP Law, LLP

(57)          ABSTRACT

A method of malware detection includes performing, by a second device of a plurality of devices on a network, a fuzzy matching between a second sequence of events occurring at the second device and a first sequence of captured events that occurred at a first device of the plurality of devices on the network; determining, by the second device, that a result of the fuzzy matching reaches a first threshold; and in response to determining that the result of the fuzzy matching reaches the first threshold, initiating a detailed instrumentation at the second device. The method can further include determining, by the second device, that a first condition is satisfied; and in response to determining that the first condition is satisfied: generating a second malware behavior package including information from the detailed instrumentation; and communicating the second malware behavior package over the network.

20 Claims, 4 Drawing Sheets

(56)          References Cited

U.S. PATENT DOCUMENTS

| | | |
|---|---|---|
| 2021/0409431 A1 | 12/2021 | Wang et al. |
| 2023/0114821 A1* | 4/2023 | Thomas .............. H04L 63/1433 |
| | | 726/23 |
| 2023/0308460 A1* | 9/2023 | Thomas ................ H04L 63/102 |

* cited by examiner

300

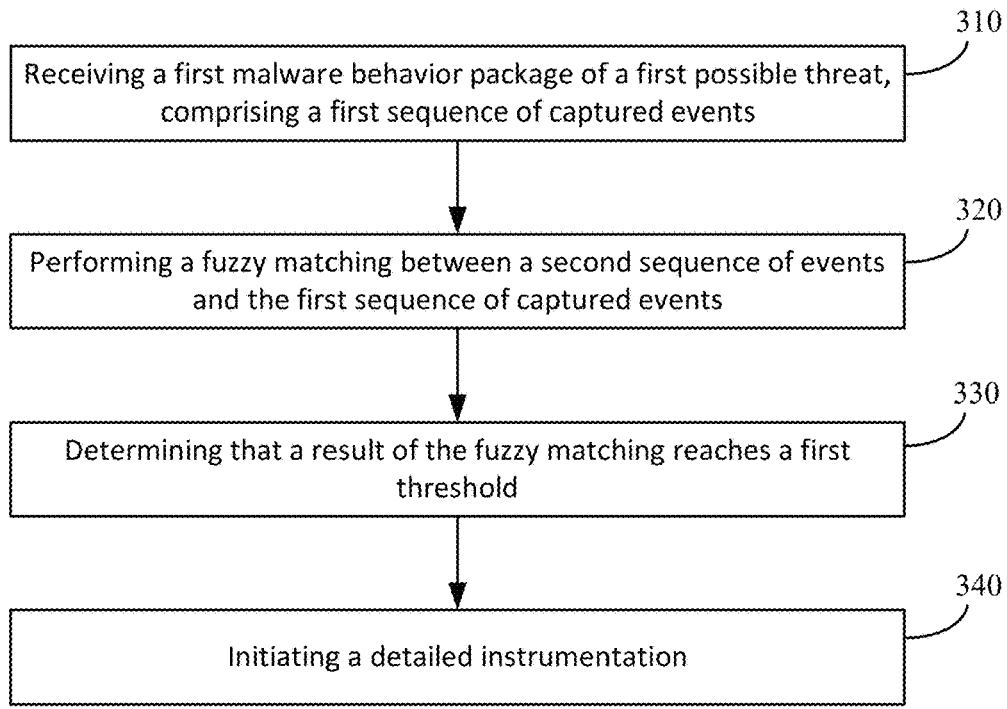

310

Receiving a first malware behavior package of a first possible threat, comprising a first sequence of captured events

320

Performing a fuzzy matching between a second sequence of events and the first sequence of captured events

330

Determining that a result of the fuzzy matching reaches a first threshold

340

Initiating a detailed instrumentation

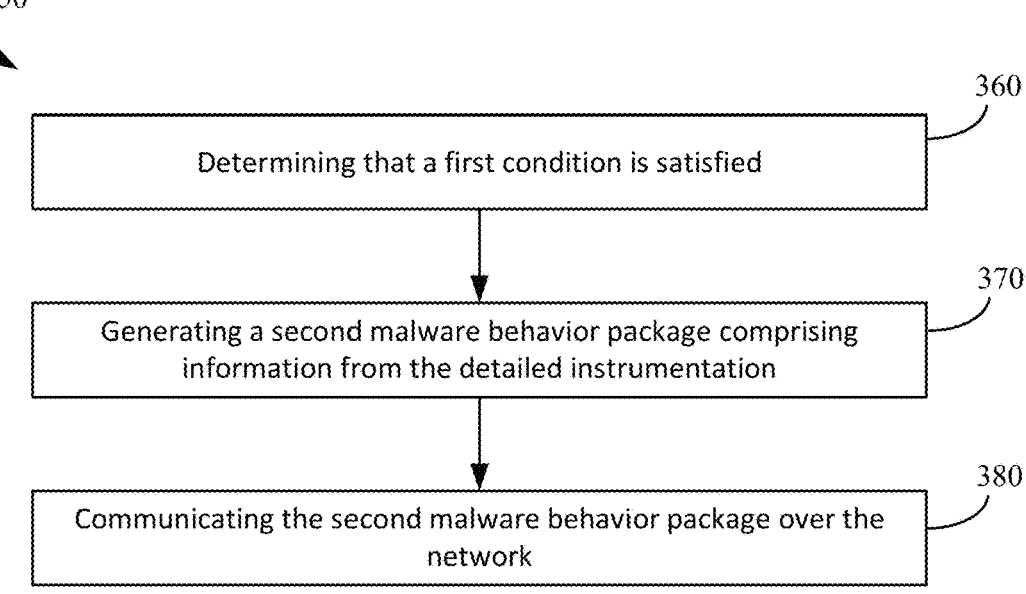

360

Determining that a first condition is satisfied

370

Generating a second malware behavior package comprising information from the detailed instrumentation

380

Communicating the second malware behavior package over the network

FIG. 3B

MALWARE DETECTION FROM APPROXIMATE INDICATORS

BACKGROUND

Attacks, such as ones caused by malware, affect computer programs that run on computers and may cause significant damage to the computers and/or to finances, accounts, data, public image, etc. that are managed online and are owned by users using the computers. There are an extraordinary number of computing systems deployed in modern times, and although the chances of a specific machine encountering malicious vectors are extremely rare, at scale, at any given time, there are likely processors that are about to execute malware, are executing malware, or have just been exploited.

BRIEF SUMMARY

Malware detection from approximate indicators is described. Given a mechanism to store compact histories of encountered software behaviors, a history of encountered software behaviors preceding suspicious activity at one processor can be used as precursor signatures for triggering detailed tracing and/or monitoring in other processors. Under greedy attack models, once one processor encounters suspicious activity, some other processors will likely see suspicious activity shortly thereafter. Thus, by acting upon approximate indicators, and using fuzzy matching, it is possible to more quickly capture information to generate detailed traces that may better describe the suspicious activity in flight. Further, this action can repeat at other processors. For example, in a cascading effect, other receiving devices can further detect precursor indicators to generate even more detailed traces. This behavior can include parallel detection (e.g., detection by multiple processors from the same approximate indicators) and sequential detection (e.g., detection by a processor from the detailed traces of an earlier detection of the approximate indicators by another processor).

A method of malware detection is provided that includes receiving, at a second device of a plurality of devices on a network, a first malware behavior package of a first possible threat, wherein the first malware behavior package includes a first sequence of captured events that occurred at a first device of the plurality of devices on the network; performing, by the second device, a fuzzy matching between a second sequence of events and the first sequence of captured events, wherein the second sequence of events includes information of local events occurring at the second device and relative time between occurrences of the local events; determining, by the second device, that a result of the fuzzy matching reaches a first threshold; and in response to determining that the result of the fuzzy matching reaches the first threshold, initiating a detailed instrumentation at the second device.

The method can further include determining, by the second device, that a first condition is satisfied; and in response to determining that the first condition is satisfied: generating a second malware behavior package comprising information from the detailed instrumentation; and communicating the second malware behavior package over the network.

In some cases, the fuzzy matching can include performing a convolution of the first sequence with a distance function over the second sequence.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 3A illustrates a method of malware detection in accordance with certain embodiments described herein.

FIG. 3B illustrates further operations of a method of malware detection in accordance with certain embodiments described herein.

DETAILED DESCRIPTION

Malware detection from approximate indicators is described. Given a mechanism to store compact histories of encountered software behaviors, a history of encountered software behaviors preceding suspicious activity at one processor can be used as precursor signatures for triggering detailed tracing and/or monitoring in other processors. Under greedy attack models, once one processor encounters suspicious activity, the other processors will likely see suspicious activity shortly thereafter. Thus, by acting upon approximate indicators, it is possible to more quickly capture information to generate detailed traces that may better describe the suspicious activity in flight. Further, this action can repeat at other processors. For example, in a cascading effect, other receiving devices can further detect precursor indicators to generate even more detailed traces. This behavior can include parallel detection (e.g., detection by multiple processors from the same approximate indicators) and sequential detection (e.g., detection by a processor from the detailed traces of an earlier detection of the approximate indicators by another processor).

Figure 1:
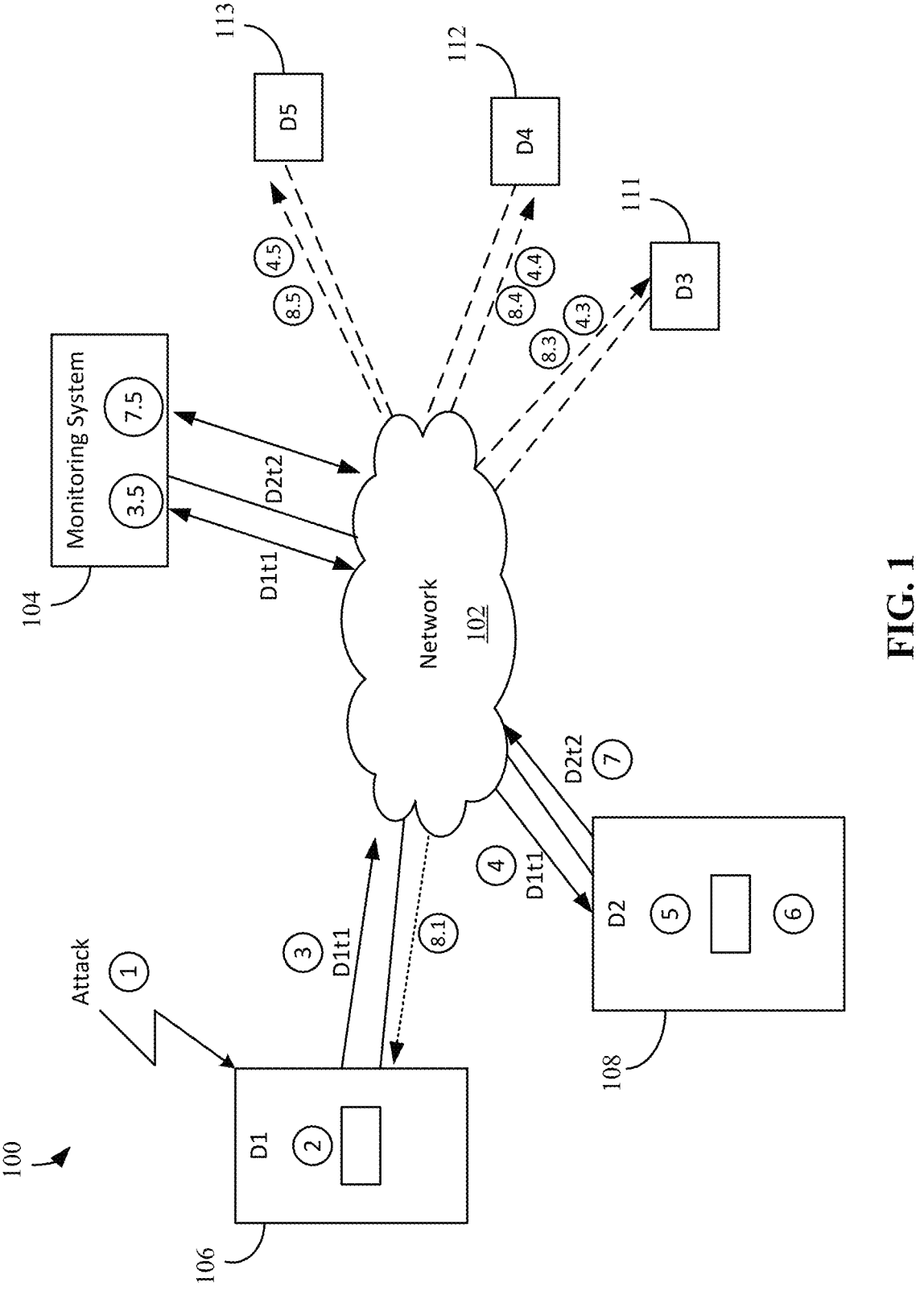
FIG. 1 illustrates an operating environment in which the described malware detection can be carried out.

FIG. 1 illustrates an operating environment in which the described malware detection can be carried out. Referring to the illustrative operating environment 100 in FIG. 1, numerous computing devices can be connected over a network 102, for example as part of a community of processors/collection of processors. A monitoring system 104 can optionally be included, for example, as part of a network firewall or other system that monitors the network 102.

In environment 100, at least some of the computing devices will likely encounter suspicious activity. For example, an attack may be occurring (1) such that a first device 106 is executing malware and/or was just exploited. As a result of the activities occurring at the first device, a first malware behavior package (labeled D1t1) is generated (2) and communicated (3) over the network 102. The first malware behavior package can be sent to the monitoring system 104, which may collect the data, perform certain analysis (3.5), and provide the first malware behavior package to all the devices that the monitoring system 104 is monitoring on the network 102. In some cases, the first malware behavior package D1t1 can be sent from the first device 106 directly to the other devices on the network 102.

The other devices (e.g., D2 108, D3 111, D4 112, D5 113) on the network 102 receive (e.g., steps 4, 4.3, 4.4, 4.5) the first malware behavior package of a first possible threat. Each of these other devices can act upon approximate indicators by performing a partial approximate match (e.g., fuzzy matching) to the behavior described by the first malware behavior package. For example, a second device 108 receives (4) the first malware behavior package and performs (5) a method of malware detection, for example, as described with respect to device 200 of FIG. 2 and method 300 of FIG. 3A. The second device 108 may itself be experiencing the attack and, while unaware, is executing malware or about to execute malware. Through use of the first malware behavior package and the performing of a fuzzy matching, the second device 108 can capture additional precursory information (e.g., the process being executed and/or behavior information) and generate (6) a second malware behavior package D2t2, for example as described with respect to device 200 of FIG. 2 and method 350 of FIG. 3B. The second device 108 can communicate (7) the second malware behavior package D2t2 over the network 102. Similar to the operations described with respect to the first device 106, the second malware behavior package D2t2 can be sent to the monitoring system 104, which may collect the data, perform certain analysis (7.5), and provide the second malware behavior package to all the devices that the monitoring system 104 is monitoring on the network 102. In some cases, the second malware behavior package D2t2 can be sent from the second device 108 directly to the other devices on the network 102. The other devices (e.g., D1 106, D3 111, D4 112, D5 113) can receive (e.g., steps 8.1, 8.3, 8.4, 8.5) the second behavior package.

Accordingly, when a third device (e.g., D3 111) receives the second malware behavior package after the first malware behavior package, it is possible for the third device to update the first malware behavior package with the second malware behavior package (e.g., by combining or replacing), enabling a better quality fuzzy match.

The monitoring system 104, by collecting the data of a particular attack on the multiple devices—even if individual information is incomplete, is able to potentially obtain detailed traces that can better describe suspicious activity in flight. In addition, it is possible for the monitoring system 104 to create refined sequences of events by combining information from multiple devices and sending the refined sequences of events as a malware behavior package. As mentioned above, the monitoring system can perform analysis on the data/behavior packages. This may be performed at the monitoring system or as part of an analysis service, which can inspect and/or perform instrumentation on the behavior information. Examples of analyses that can be performed include taint analysis, attribution to source code, and matching against known attack signatures. Results of the data capture can be used to highlight potential issues and solutions in an automated fashion and provide the information to security personnel for additional review/analysis. Updates to the monitoring system 104 (and/or devices that are being monitored) can be carried out to prevent issues/future similar attacks.

In the illustrative scenario, five computing devices are shown; however, embodiments are not limited thereto. Indeed, any number of computing devices may be able to communicate with each other and/or monitoring system 104 to provide behavior information/malware behavior packages and receive malware behavior packages.

Figure 2:
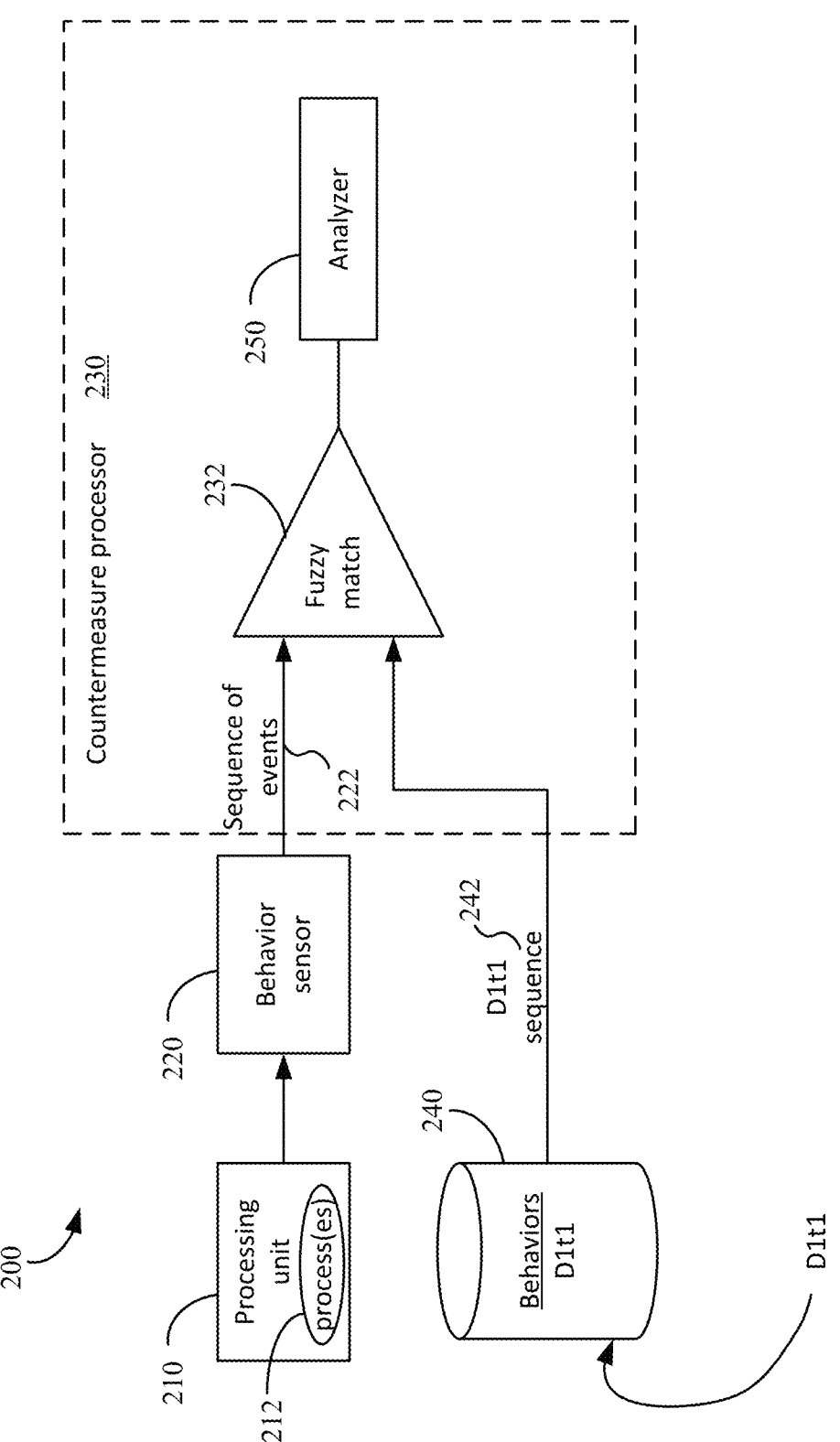
FIG. 2 illustrates a representational diagram of a device performing malware detection from approximate indicators.

FIG. 2 illustrates a representational diagram of a device performing malware detection from approximate indicators. Device 200 can represent any devices on network 102 of FIG. 1, including the second device 108.

Referring to FIG. 2, device 200 can include a processing unit 210, which executes one or more process(es) 212. Behavior of the device 200 during execution of a code generating the one or more processes 212 can be identified using a local detector such as behavior sensor 220. In some cases, behavior sensor 220 can be implemented such as described in U.S. application Ser. No. 17/887,927. Behavior sensor 220 can detect events occurring at the processing unit 210 and produce, from the behavior of the device 200 during execution of the code, information of the local events and the relative time between occurrences of the local events. A sequence of events 222 including this information of the local events and the relative time between the occurrences of the local events is used by a countermeasure processor 230.

Countermeasure processor 230 can be a separate processor from processing unit 210 or the same processor executing different instructions. In some cases, countermeasure processor 230 is part of a local monitoring engine that evaluates local information for potential attacks and/or performance. For the described malware detection operations, countermeasure processor 230 includes a fuzzy matching module 232, which can include hardware and/or software. In some cases, fuzzy matching module 232 is implemented using a state machine. Fuzzy matching module 232 performs a fuzzy matching of the sequence of events 222 to behaviors that may be indicative of an attack (e.g., sequence 242). Information of behaviors that may be indicative of an attack can be stored in a storage resource 240 of the device 200. The output of the fuzzy matching module 232 is evaluated by an analyzer 250, which determines whether a trigger event has been encountered and initiates appropriate countermeasures. The analyzer 250 can receive other input signals including, but not limited to, the output of behavior sensor 220 directly, control signals, and power signals. For example, the device 200 can monitor the sequence of events 222 for a second or third trigger (that is not based on the fuzzy matching) and when one of these triggers are detected, the device 200 can perform a particular countermeasure response to the trigger. It should be understood that the analyzer 250 can be implemented in hardware (e.g., logic gates, application specific integrated circuit, etc.) or as software executed by a processor (e.g., the countermeasure processor which may be the same or different processor as processing unit 210).

FIG. 3A illustrates a method of malware detection in accordance with certain embodiments described herein; and FIG. 3B illustrates further operations of a method of malware detection in accordance with certain embodiments described herein.

Method 300 and method 350 can be performed by any device of a plurality of devices that may be connected over a network and can begin upon at least one device on the network reporting suspicious activity in a manner that includes information of events occurring at that at least one device (e.g., as an event trace or some other form of consumable information). Although reference is made in the method to a first device and a second device, it should be understood that these terms are used merely to distinguish between two different devices (and corresponding information).

Turning to the steps illustrated in FIG. 3A, at step 310, a device (e.g., second device 108 of FIG. 1, device 200 of FIG. 2) of a plurality of device on a network can receive a first malware behavior package of a first possible threat. The first malware behavior package includes a first sequence of captured events that occurred at a first device (e.g., first device 106) of the plurality of devices on the network. For example, referring to FIG. 2, a first malware behavior package D1t1 can be received at the second device 108 and, when second device 108 is implemented as device 200, stored at storage resource 240. In some cases, the first malware behavior package is received from a monitoring system (e.g., monitoring system 104) that is in communication with the plurality of devices on the network. In some cases, the first malware behavior package is received from the first device (e.g., first device 106).

At step 320, the method further includes performing, by the second device, a fuzzy matching between a second sequence of events and the first sequence of captured events. As described with respect to FIG. 2, the second sequence of events (e.g., sequence of events 222) includes information of local events occurring at the second device and relative time between occurrences of the local events. Performing the fuzzy matching (step 320) can include performing a convolution of the first sequence with a distance function over the second sequence. In some cases, the distance function involves a difference to a norm value. In some cases, the distance function involves cosine similarity. In some cases, edit distances are used. In some cases, the distance function can be set to dynamic time warping. In some cases, raw convolution can be performed.

At step 330, the method further includes determining, by the second device, that a result of the fuzzy matching reaches a first threshold. The first threshold can be based on any suitable metric for the fuzzy matching.

At step 340, in response to determining that the result of the fuzzy matching reaches the first threshold, the method further includes initiating a detailed instrumentation at the second device. The detailed instrumentation at the second device can include recording the second sequence of events. The information from the detailed instrumentation recording the second sequence of events can thus include a sequence of captured events of the second sequence of events. In some cases, the detailed instrumentation further or alternatively includes monitoring network traffic, monitoring system calls, monitoring file Input/Output (I/O), or a combination thereof. Capturing events of the second sequence of events can be performed, for example, using existing debugging infrastructure such as, but not limited to, instruction trace and data trace, where what is happening in the processor is recorded into a buffer or other storage device. In some cases, the events can be captured as part of a memory stack managed by an operating system (and including a stack frame, a heap frame, data, and other text). In some cases, the events can be captured in a consumable format (such as described above with respect to behavior sensor 220 of FIG. 2.

Turning to the steps illustrated in FIG. 3B, at step 360, the method further includes determining, by the second device, that a first condition is satisfied. Determining that the first condition is satisfied can include determining that the result of the fuzzy matching reaches a second threshold. The second threshold can be indicative that as the second sequence of events occur that the second sequence of events continues to follow the first sequence at a sufficient amount (e.g., similar enough based on the distance function). In some cases, determining that the first condition is satisfied includes determining that a specified amount of time has passed after initiating the detailed instrumentation. This can assist in triggering the next steps while it is still possible to perform the next steps (e.g., in case other countermeasures are triggered that could stop operations of the device). In some cases, determining that the first condition is satisfied includes determining from the information of the local events that a trigger behavior is present. The trigger behavior may be based on known threats and may or may not be related to performing the fuzzy matching. In some cases, determining that the first condition is satisfied includes determining that a trigger behavior occurred based on the information from the detailed instrumentation, for example, from network traffic, system calls, file I/O, etc. In some cases, the first condition can be a combination of conditions (including those described above).

In some cases, the first condition can vary or change as a result of other operations or states of the device. For example, the second device can receive an update to the first condition that modifies the first condition. This update can be provided as part of a feedback operation of the device (and/or operating system). As an illustrative example, the state of the second device may be low power mode. Thus, the update to the first condition that modifies the first condition can be received in response to the second device being in a low power mode, wherein the update to the first condition is a change to reduce an amount of time for collecting the information from the detailed instrumentation. This is beneficial since detailed instrumentation can consume significant resources and reducing the amount of time in which data is being collected may enable the device to continue to operate (e.g., to perform other countermeasures).

It should be understood that any number of malware behavior packages can be received at the device (e.g., the second device) and used for performing the described method of malware detection—whether describing the same potential attack or different attacks. For example, the second device can receive a plurality of malware behavior packages in addition to the first malware behavior package; and perform fuzzy matching between the second sequence of events and sequences of captured events indicated by the plurality of malware behavior packages. The detailed instrumentation is initiated upon any results of fuzzy matching reaching the first threshold. As another example, the second device can receive the plurality of malware behavior packages in addition to the first malware behavior package and combine the information in the malware behavior packages to create a more refined sequence of captured events that is used when performing the fuzzy matching. As yet another example, a monitoring system can combine information of captured events from multiple devices of the plurality of devices to create a more refined sequence of captured events and provide the combined/refined sequence to the second device in a single malware behavior package. In one of such examples, the first malware behavior package includes information from at least one other device of the plurality of devices that is combined, by the monitoring system, with the first sequence of captured events that occurred at the first device to form a refined first sequence of captured events. In some cases, sequences can be combined by finding overlapping sections.

At step 370, in response to determining that the first condition is satisfied, the method further includes generating a second malware behavior package comprising information from the detailed instrumentation. The second malware behavior package can be generated similarly to the first malware behavior package at the first device. As mentioned above with respect to initiating the detailed instrumentation in step 340, the information from the detailed instrumentation can be captured in a variety of ways. In some cases, packaging the captured information includes generating a snapshot of the memory stack.

At step 380, the method further includes communicating the second malware behavior package over the network.

Communicating the second malware behavior package over the network can include communicating the second malware behavior package to a monitor system (e.g., monitoring system 104 of FIG. 1) that monitors the plurality of devices on the network. In some cases, communicating the second malware behavior package over the network includes communicating the second malware behavior package to other devices of the plurality of devices on the network.

Accordingly, once the fuzzy matching reaches the first threshold, the device can begin recording events (as well as perform other instrumentation). Then, further monitoring is carried out to determine that a first criteria is satisfied in order to continue countermeasure behaviors.

As one example scenario, the first sequence can be broken up into windows, each with a subset of the first sequence. The first window is used to scan the second sequence of events, as the second sequence of events is occurring, for a fuzzy match above a threshold. Once there is a sufficient fuzzy match, the instrumentation can begin and the next window is fuzzy matched against the next window of the second sequence of events. If the fuzzy matching continues to be above the threshold, the next window is compared and so on. If the fuzzy matching indicates an insufficient fuzzy match, the instrumentation can stop and the first window is used again to scan the second sequence of events for a fuzzy match. In addition, any recorded data can be deleted, preserving privacy and memory space. While the instrumentation is being performed and sufficient fuzzy matching is occurring, various monitoring can be carried out for determining whether a first criteria is satisfied.

As another example scenario, as the second sequence of events are occurring, the smaller 'string' of events is fuzzy matched against the longer first sequence. Once there is a matching of over a threshold amount of the entire first sequence, the instrumentation can begin. For example, if there is a sufficient match of 70% of the sequence, then instrumentation can begin.

Figure 4:
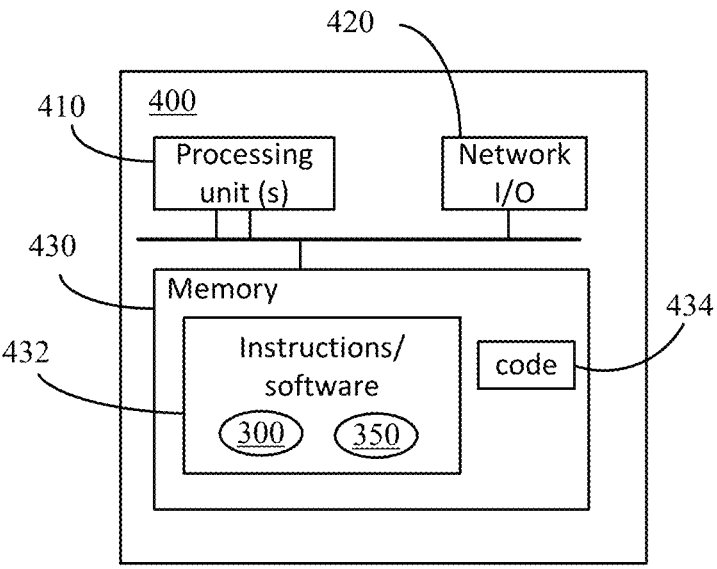
FIG. 4 illustrates a simplified representation of a device that can perform the described malware detection.

FIG. 4 illustrates a simplified representation of a device that can perform the described malware detection. Referring to FIG. 4, device 400 can include processing unit(s) 410, network interface 420, and memory 430. Memory 430 stores instructions 432 for performing the described method of malware detection (e.g., including method 300 and method 350) and code 424 for a variety of applications (including an operating system).

Although specific reference is made to a processing unit 410, the processing unit 410 can be any processor/processing element such as, but not limited to, a CPU, graphics processing unit (GPU), microcontroller, or computing unit (e.g., multiplier-accumulator (MAC) unit with memory). In some cases, processing unit 410 can be implemented using application specific integrated circuits (ASICs), field programmable gate arrays (FPGA), microprocessors or other hardware circuitry.

Network interface 420 can include any suitable communications or network interface that enables computing device 400 to communicate with other devices including by wireless and/or wired means.

Memory 430 can include volatile and non-volatile memory hardware and can include built-in (e.g., system on a chip) and/or removable memory hardware. Examples of volatile memory include random-access memories (RAM, DRAM, SRAM). Examples of non-volatile memory include flash memory, various read-only memories (ROM, PROM, EPROM, EEPROM), phase change memory, magnetic and ferromagnetic/ferroelectric memories (MRAM, FeRAM). Although a single memory block is shown in the drawing, it should be understood that there are different levels/hierarchy of memory and components that may be used (e.g., cache memories, processor registers, system RAM, disk drives, secondary storage, etc.). In some cases, instructions 432 are provided on a computer-readable storage medium. A computer-readable storage medium includes any suitable memory such as described with respect to memory 430. It should be understood that in no case does the computer-readable storage medium or memory consist of propagating signals (e.g., carrier waves).

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method of malware detection comprising:
   receiving, at a second device of a plurality of devices on a network directly from a first device of the plurality of devices over the network, a first malware behavior package of a first possible threat, wherein the first malware behavior package comprises a first sequence of captured events that occurred at the first device of the plurality of devices on the network;
   performing, by the second device, a fuzzy matching between a second sequence of events and the first sequence of captured events, wherein the second sequence of events comprises information of local events occurring at the second device and relative time between occurrences of the local events;
   determining, by the second device, that a result of the fuzzy matching reaches a first threshold;
   in response to determining that the result of the fuzzy matching reaches the first threshold, initiating a detailed instrumentation at the second device;
   determining, by the second device, that a first condition is satisfied; and
   in response to determining that the first condition is satisfied:
      generating a second malware behavior package comprising information from the detailed instrumentation; and
      communicating the second malware behavior package over the network; and
   receiving an update to the first condition that modifies the first condition,
   wherein the update to the first condition that modifies the first condition is received in response to the second device being in a low power mode, wherein the update to the first condition is a change to reduce an amount of time for collecting the information from the detailed instrumentation.

2. The method of malware detection of claim 1, wherein performing, by the second device, the fuzzy matching between the second sequence of events and the first sequence of captured events comprises:
   performing a convolution of the first sequence with a distance function over the second sequence.

3. The method of malware detection of claim 1, wherein the detailed instrumentation at the second device comprises recording the second sequence of events, wherein information from the detailed instrumentation recording the second sequence of events comprises a sequence of captured events of the second sequence of events.

4. The method of malware detection of claim 1, wherein the detailed instrumentation at the second device comprises monitoring network traffic, monitoring system calls, monitoring file Input/Output (I/O), or a combination thereof.

5. The method of malware detection of claim 1, wherein determining that the first condition is satisfied comprises determining that the result of the fuzzy matching reaches a second threshold.

6. The method of malware detection of claim 1, wherein determining that the first condition is satisfied comprises determining that a specified amount of time has passed after initiating the detailed instrumentation.

7. The method of malware detection of claim 1, wherein determining that the first condition is satisfied comprises determining from the information of the local events that a trigger behavior is present.

8. The method of malware detection of claim 1, wherein determining that the first condition is satisfied comprises determining that a trigger behavior occurred based on the information from the detailed instrumentation.

9. The method of malware detection of claim 1, wherein communicating the second malware behavior package over the network comprises communicating the second malware behavior package to a monitor system that monitors the plurality of devices on the network.

10. The method of malware detection of claim 1, wherein communicating the second malware behavior package over the network comprises communicating the second malware behavior package to other devices of the plurality of devices on the network.

11. The method of malware detection of claim 1, further comprising:

identifying, by a local detector of the second device, behavior of the second device during execution of a code, wherein the local detector produces, from the behavior of the second device during execution of the code, the information of the local events and the relative time between occurrences of the local events.

12. The method of malware detection of claim 1, wherein the first malware behavior package is received from a monitoring system that is in communication with the plurality of devices on the network.

13. The method of malware detection of claim 12, wherein the first malware behavior package further comprises information captured from at least one other device of the plurality of devices that is combined, by the monitoring system, with the first sequence of captured events that occurred at the first device to form a refined first sequence of captured events.

14. The method of malware detection of claim 1, wherein the first malware behavior package is received from the first device.

15. The method of malware detection of claim 1, further comprising:

receiving, at the second device, a plurality of malware behavior packages in addition to the first malware behavior package; and performing, by the second device, fuzzy matching between the second sequence of events and sequences of captured events indicated by the plurality of malware behavior packages, wherein the detailed instrumentation is initiated upon any results of fuzzy matching reaching the first threshold.

16. A computer-readable storage medium having instructions stored thereon that when executed by a processor of a device, direct the device to:

receive, at the device of a plurality of devices on a network, a first malware behavior package of a first possible threat, wherein the first malware behavior package comprises a first sequence of captured events that occurred at a first device of the plurality of devices on the network;

perform, by the device, a fuzzy matching between a second sequence of events and the first sequence of captured events, wherein the second sequence of events comprises information of local events and relative time between occurrences of the local events;

determine, by the device, that a result of the fuzzy matching reaches a first threshold;

in response to the result of the fuzzy matching reaching the first threshold, initiate a detailed instrumentation at the device;

determine, by the device, that a first condition is satisfied;

in response to the first condition being satisfied:

generate a second malware behavior package comprising information from the detailed instrumentation; and communicate the second malware behavior package over the network;

determine, by the device, that a first condition is satisfied; and receive an update to the first condition that modifies the first condition, wherein the update to the first condition that modifies the first condition is received in response to the device being in a low power mode, wherein the update to the first condition is a change to reduce an amount of time for collecting the information from the detailed instrumentation.

17. The computer-readable storage medium of claim 16, wherein the detailed instrumentation comprises recording the second sequence of events.

18. The computer-readable storage medium of claim 16, wherein the detailed instrumentation comprises monitoring network traffic, monitoring system calls, monitoring file Input/Output (I/O), or a combination thereof.

19. The computer-readable storage medium of claim 16, wherein the instructions that direct the device to determine that the first condition is satisfied further comprise instructions that direct the device to determine that the result of the fuzzy matching reaches a second threshold.

20. A device comprising:

a processor;

a network interface;

a memory; and instructions stored on the memory that when executed by the processor direct the device to:

receive, at the device of a plurality of devices on a network directly from a first device of the plurality of devices over the network, a first malware behavior package of a first possible threat, wherein the first malware behavior package comprises a first sequence of captured events that occurred at the first device of the plurality of devices on the network;

perform, by the device, a fuzzy matching between a second sequence of events and the first sequence of captured events, wherein the second sequence of events comprises information of local events and relative time between occurrences of the local events;

determine, by the device, that a result of the fuzzy matching reaches a first threshold;

in response to the result of the fuzzy matching reaching the first threshold, initiate a detailed instrumentation at the device;

determine, by the device, that a first condition is satisfied; and in response to the first condition being satisfied:

generate a second malware behavior package comprising information from the detailed instrumentation; and communicate the second malware behavior package over the network; and receive an update to the first condition that modifies the first condition, wherein the update to the first condition that modifies the first condition is received in response to the device being in a low power mode, wherein the update to the first condition is a change to reduce an amount of time for collecting the information from the detailed instrumentation.

* * * * *